(12) United States Patent
Boyd et al.

(10) Patent No.: US 11,448,049 B2
(45) Date of Patent: Sep. 20, 2022

(54) GAS ASSISTED PLUNGER LIFT CONTROL SYSTEM AND METHOD

(71) Applicant: Flowco Production Solutions, LLC, Fort Worth, TX (US)

(72) Inventors: Mitchell A. Boyd, Haslet, TX (US); Garrett S. Boyd, Granbury, TX (US)

(73) Assignee: FLOWCO PRODUCTION SOLUTIONS, LLC, Fort Worth, TX (US)

( * ) Notice: Subject to any disclaimer, the term of this patent is extended or adjusted under 35 U.S.C. 154(b) by 0 days.

(21) Appl. No.: 17/012,438

(22) Filed: Sep. 4, 2020

(65) Prior Publication Data

US 2021/0071505 A1    Mar. 11, 2021

Related U.S. Application Data

(60) Provisional application No. 62/896,044, filed on Sep. 5, 2019.

(51) Int. Cl.
*E21B 43/12*      (2006.01)
*G01F 1/38*       (2006.01)

(52) U.S. Cl.
CPC ......... *E21B 43/122* (2013.01); *E21B 43/128* (2013.01); *G01F 1/38* (2013.01)

(58) Field of Classification Search
CPC .... E21B 43/122; E21B 43/128; E21B 43/121; G01F 1/38
See application file for complete search history.

(56) References Cited

U.S. PATENT DOCUMENTS

| | | | |
|---|---|---|---|
| 1,415,788 A | 5/1922 | Burlin | |
| 1,509,386 A | 11/1924 | Wilson | |

(Continued)

FOREIGN PATENT DOCUMENTS

| | | | |
|---|---|---|---|
| CA | 2428618 A1 | 11/2004 | |
| CA | 2635993 A1 | 12/2009 | |

(Continued)

OTHER PUBLICATIONS

Bal-Seal, Bal Spring (tm) Canted Coil Springs for Mechanical Applications, product website, 3 pages, www.balseal.com/mechanical.
Lufkin, Plunger lift; Bumper Springs website, © 2013 Lufkin Industries, LLC www.lufkin.com.
Weatherford, Plunger Lift Systems brochure, ©2005 Weatherford www.weatherford.com.

(Continued)

*Primary Examiner* — Michael R Wills, III
(74) *Attorney, Agent, or Firm* — FisherBroyles, LLP; Jason P. Mueller (57) ABSTRACT

A disclosed control system for a gas assisted plunger lift (GAPL) system includes a sensor and a processor circuit. The sensor is configured to measure a plunger speed and/or velocity and the processor circuit is configured to control various parameters of the GAPL based on the measured plunger speed and/or velocity. The processor circuit may be configured to adjust a gas injection rate parameter based on the measured plunger speed and/or velocity, and/or may adjust one or more parameters including: a close time, an afterflow time, a flow rate, a load factor, a tubing pressure, a casing pressure, and a tubing/casing differential pressure. The controller may be further configured to adjust all parameters simultaneously or may sequentially adjust a first sub-set of parameters and then adjust a second sub-set of parameters. The first sub-set may include a gas injection flow rate and the second sub-set may include after-flow and close time parameters.

20 Claims, 5 Drawing Sheets

(56) References Cited

U.S. PATENT DOCUMENTS

| | | |
|---|---|---|
| 1,910,616 A | 5/1933 | Leahy |
| 1,932,992 A | 10/1933 | Sheman et al. |
| 2,018,204 A | 10/1935 | Seth et al. |
| 2,175,770 A | 10/1939 | Dodson |
| 2,215,751 A | 9/1940 | Coleman |
| 2,301,319 A | 11/1942 | Peters |
| 2,312,476 A | 3/1943 | Penick et al. |
| 2,437,429 A | 3/1948 | Hossfeld |
| 2,509,922 A | 5/1950 | Hall |
| 2,642,002 A | 6/1953 | Knox et al. |
| 2,661,024 A | 12/1953 | Knox |
| 2,676,547 A | 4/1954 | Knox |
| 2,714,855 A | 8/1955 | Brown |
| 2,762,310 A | 9/1956 | Eklund |
| 2,785,757 A | 3/1957 | Middleton |
| 2,878,754 A | 3/1959 | McMurry |
| 2,956,797 A | 10/1960 | Polhemus |
| 2,962,978 A | 12/1960 | Paul |
| 2,970,547 A | 2/1961 | McMurry |
| 3,020,852 A | 2/1962 | Roach et al. |
| 3,055,306 A | 9/1962 | Tausch |
| 3,090,315 A | 5/1963 | Milton |
| 3,127,197 A | 3/1964 | Kretzschmar |
| 3,146,725 A | 9/1964 | Harris |
| 3,171,487 A | 3/1965 | Ault |
| 3,181,470 A | 5/1965 | Clingman |
| 3,304,874 A | 2/1967 | Ray |
| 3,395,759 A | 8/1968 | Talley, Jr. |
| 3,412,798 A | 11/1968 | Gregston |
| 3,508,428 A | 4/1970 | Matson, Jr. |
| 3,806,106 A | 4/1974 | Hamel et al. |
| 3,861,471 A | 1/1975 | Douglas |
| 3,944,641 A | 3/1976 | Lemelson |
| 4,018,248 A | 4/1977 | Carr |
| 4,030,858 A | 6/1977 | Coles, Jr. |
| 4,211,279 A | 7/1980 | Isaacks |
| 4,239,458 A | 12/1980 | Yeatts |
| 4,440,229 A | 4/1984 | Burch |
| 4,502,843 A | 3/1985 | Martin |
| 4,531,891 A | 7/1985 | Coles, III |
| 4,571,162 A | 2/1986 | Knox |
| 4,629,004 A | 12/1986 | Griffin |
| 4,782,896 A | 11/1988 | Witten |
| 4,896,720 A | 1/1990 | DeRouen |
| 4,932,471 A | 6/1990 | Tucker et al. |
| 4,951,752 A | 8/1990 | Coleman |
| 4,995,459 A | 2/1991 | Mabry |
| 5,218,763 A | 6/1993 | Marker et al. |
| 5,253,713 A | 10/1993 | Gregg et al. |
| 5,280,890 A | 1/1994 | Wydra |
| 5,417,291 A | 5/1995 | Leising |
| 5,427,504 A | 6/1995 | Dinning et al. |
| 5,868,384 A | 2/1999 | Anderson |
| 6,045,335 A | 4/2000 | Dinning |
| 6,148,923 A | 11/2000 | Casey |
| 6,176,309 B1 | 1/2001 | Bender |
| 6,200,103 B1 | 3/2001 | Bender |
| 6,209,637 B1 | 4/2001 | Wells |
| 6,234,770 B1 | 5/2001 | Ridley et al. |
| 6,467,541 B1 | 10/2002 | Wells |
| 6,478,087 B2 | 11/2002 | Allen |
| 6,554,580 B1 | 4/2003 | Mayfield et al. |
| 6,637,510 B2 | 10/2003 | Lee |
| 6,644,399 B2 | 11/2003 | Abbott et al. |
| 6,669,449 B2 | 12/2003 | Giacomino |
| 6,725,916 B2 | 4/2004 | Gray et al. |
| 6,745,839 B1 | 6/2004 | Simpson |
| 6,755,628 B1 | 6/2004 | Howell |
| 6,808,019 B1 | 10/2004 | Mabry |
| 6,846,509 B2 | 1/2005 | Chen et al. |
| 6,848,509 B2 | 2/2005 | Myerley |
| 6,907,926 B2 | 6/2005 | Bosley |
| 7,040,401 B1 | 5/2006 | McCannon |
| 7,055,812 B2 | 6/2006 | Balsells |
| 7,121,335 B2 | 10/2006 | Townsend |
| 7,290,602 B2 | 11/2007 | Victor |
| 7,314,080 B2 | 1/2008 | Giacomino |
| 7,322,417 B2 | 1/2008 | Rytlewski et al. |
| 7,328,748 B2 | 2/2008 | Giacomino |
| 7,383,878 B1 | 6/2008 | Victor |
| 7,438,125 B2 | 10/2008 | Victor |
| 7,475,731 B2 | 1/2009 | Victor |
| 7,513,301 B2 | 4/2009 | Victor |
| 7,523,783 B2 | 4/2009 | Victor |
| 7,819,189 B1 * | 10/2010 | Cosby ............... E21B 43/121 166/255.1 |
| 7,954,545 B2 | 6/2011 | Hearn et al. |
| 8,181,706 B2 | 5/2012 | Tanton |
| 8,286,700 B1 | 10/2012 | Franchini |
| 8,347,955 B1 | 1/2013 | Sewell et al. |
| 8,448,710 B1 | 5/2013 | Stephens |
| 8,464,798 B2 | 6/2013 | Nadkrynechny |
| 8,627,892 B2 | 1/2014 | Nadkrynechny |
| 8,757,267 B2 | 6/2014 | Mitchell et al. |
| 8,863,837 B2 | 10/2014 | Bender et al. |
| 8,893,777 B1 | 11/2014 | Garrett |
| 9,068,443 B2 | 6/2015 | Jefferies et al. |
| 9,644,462 B2 * | 5/2017 | Green ............... E21B 43/122 |
| 9,677,389 B2 | 6/2017 | Boyd et al. |
| 9,683,430 B1 | 6/2017 | Kuykendall |
| 9,689,242 B2 | 6/2017 | Kuykendall et al. |
| 9,790,772 B2 | 10/2017 | Jefferies et al. |
| 10,018,015 B2 | 7/2018 | Purkis et al. |
| 10,161,230 B2 | 12/2018 | Roycroft et al. |
| 10,221,849 B2 | 3/2019 | Roycroft et al. |
| 10,273,789 B2 | 4/2019 | Boyd et al. |
| 10,550,674 B2 | 2/2020 | Boyd et al. |
| 10,767,679 B2 | 9/2020 | Balsells |
| 2002/0005284 A1 | 1/2002 | Allen |
| 2002/0074118 A1 * | 6/2002 | Fisher ............... E21B 43/12 166/250.15 |
| 2003/0155129 A1 | 8/2003 | Gray et al. |
| 2003/0198513 A1 | 10/2003 | Wang |
| 2004/0017049 A1 | 1/2004 | Fink |
| 2004/0066039 A1 | 4/2004 | Muhammad et al. |
| 2004/0070128 A1 | 4/2004 | Balsells |
| 2004/0129428 A1 | 7/2004 | Kelley |
| 2005/0056416 A1 | 3/2005 | Gray et al. |
| 2005/0241819 A1 | 11/2005 | Victor |
| 2006/0024928 A1 | 2/2006 | Seebauer et al. |
| 2006/0054329 A1 | 3/2006 | Chisholm |
| 2006/0113072 A1 | 6/2006 | Lee |
| 2006/0124292 A1 | 6/2006 | Victor |
| 2006/0124294 A1 | 6/2006 | Victor |
| 2006/0185853 A1 | 8/2006 | Bender |
| 2006/0207796 A1 | 9/2006 | Stewart |
| 2006/0214019 A1 | 9/2006 | Ollendick |
| 2006/0249284 A1 | 11/2006 | Victor |
| 2007/0110541 A1 | 5/2007 | Rawlins et al. |
| 2007/0124919 A1 | 6/2007 | Probst |
| 2007/0151738 A1 | 7/2007 | Giacomino |
| 2007/0158061 A1 | 7/2007 | Casey |
| 2008/0029271 A1 | 2/2008 | Bolding et al. |
| 2008/0029721 A1 | 2/2008 | Miyahara |
| 2009/0229835 A1 | 9/2009 | Filippov |
| 2009/0308691 A1 | 12/2009 | Commins et al. |
| 2010/0038071 A1 | 2/2010 | Scott et al. |
| 2011/0253382 A1 | 10/2011 | Nadkrynechny |
| 2011/0259438 A1 | 10/2011 | Osborne |
| 2012/0036913 A1 | 2/2012 | Johnson |
| 2012/0204977 A1 | 8/2012 | Lembcke |
| 2012/0304577 A1 | 12/2012 | Reid et al. |
| 2012/0305236 A1 | 12/2012 | Gouthaman |
| 2012/0318524 A1 | 12/2012 | Lea, Jr. |
| 2013/0020091 A1 | 1/2013 | Maerz |
| 2013/0133876 A1 | 5/2013 | Naedler et al. |
| 2014/0090830 A1 | 4/2014 | Maerz et al. |
| 2014/0116714 A1 | 5/2014 | Jefferies et al. |
| 2014/0131107 A1 | 5/2014 | Southhard |
| 2014/0131932 A1 | 5/2014 | Balsells et al. |
| 2014/0230940 A1 | 8/2014 | Patton |
| 2015/0027713 A1 | 1/2015 | Penisson |
| 2015/0136389 A1 | 5/2015 | Bergman |
| 2015/0167428 A1 | 6/2015 | Hofman et al. |

(56) References Cited

U.S. PATENT DOCUMENTS

| | | |
|---|---|---|
| 2015/0316115 A1 | 11/2015 | Carter |
| 2016/0010436 A1 | 1/2016 | Boyd |
| 2016/0061012 A1 | 3/2016 | Zimmerman, Jr. |
| 2016/0061239 A1 | 3/2016 | Heaphy et al. |
| 2016/0108710 A1 | 4/2016 | Hightower et al. |
| 2016/0238002 A1 | 8/2016 | Williams et al. |
| 2016/0245417 A1 | 8/2016 | Boyd et al. |
| 2017/0058651 A1 | 3/2017 | Damiano et al. |
| 2017/0107802 A1 | 4/2017 | Kuykendall et al. |
| 2017/0107803 A1 | 4/2017 | Cedillo et al. |
| 2017/0122084 A1 | 5/2017 | Brewer et al. |
| 2017/0268318 A1 | 9/2017 | Roycroft et al. |
| 2017/0356278 A1* | 12/2017 | Nandola ............ E21B 47/06 |
| 2017/0362917 A1 | 12/2017 | Esslemont et al. |
| 2018/0355695 A1 | 12/2018 | Holland |
| 2018/0363442 A1* | 12/2018 | Williams ............ F04B 9/1273 |
| 2019/0203570 A1 | 7/2019 | Boyd et al. |
| 2019/0353016 A1* | 11/2019 | Sandidge ............ E21B 47/10 |

FOREIGN PATENT DOCUMENTS

| | | |
|---|---|---|
| CA | 2763511 A1 | 1/2011 |
| CA | 2791489 A1 | 12/2012 |
| EP | 2085572 A2 | 8/2009 |
| GB | 1458906 | 12/1976 |

OTHER PUBLICATIONS

Smalley Steel Ring Company; Constant Section Rings (Snap Rings); product brochure (website); www.smalley.com/reatining/rings/constant-section-rings.

HP Alloys Website printout or Monel K500 (2004), https://www.hpalloy.com/Alloys/descriptions/MONELK_500.aspx?msclkid=a853e6a5db.

Lufkin, Lufkin Well Manager Controller For Rod Lift Systems; website, https://www.bhge.com/upstream/production-optimization/artificial-lift/artificial-lift-power-controls-and-automation.

* cited by examiner

GAS ASSISTED PLUNGER LIFT CONTROL SYSTEM AND METHOD

CROSS REFERENCE TO RELATED APPLICATIONS

This application claims the benefit under 35 U.S.C. § 119(e) of U.S. Provisional Patent Application No. 62/896,044 filed on Sep. 5, 2019, which is incorporated herein, in its entirety, by this reference.

BRIEF DESCRIPTION OF THE DRAWINGS

The accompanying drawings form a part of this disclosure and are incorporated into the specification. The drawings illustrate example embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein.

DETAILED DESCRIPTION

This disclosure generally relates to plunger assemblies and gas lift devices that travel through oil, gas, and/or other fluids within well tubing to rejuvenate low-producing or non-productive wells, and to improvements in the design and construction of components of such gas lift devices.

A newly drilled and completed well typically has sufficient pressure within the formation to cause liquids to flow from the formation to the surface without external assistance. Over time, the well's production volume and bottom-hole pressure may decline. When the well pressure is no longer sufficient to cause the liquids to flow to the surface, "liquid loading" or a "loaded well" condition may occur. Liquid accumulation in the downhole tubing creates a hydrostatic head that may exceed the well's natural pressure and may cause production to decrease or cease altogether.

For wells that have excess liquids and/or insufficient pressure, it is often desirable to use a plunger lift system as an artificial lifting device that increases downhole pressure after natural well pressures have diminished. These systems may also be known as gas lift plungers, differential pressure operated pistons, bypass plungers, auto-cycling plungers, etc. A plunger lift system usually requires little to no external energy and is designed to create enough pressure to efficiently "unload" or lift the liquids to the surface using residual pressure in the well. Accordingly, plunger lift systems may be a cost-effective solution to extend the life of the well.

Figure 1:
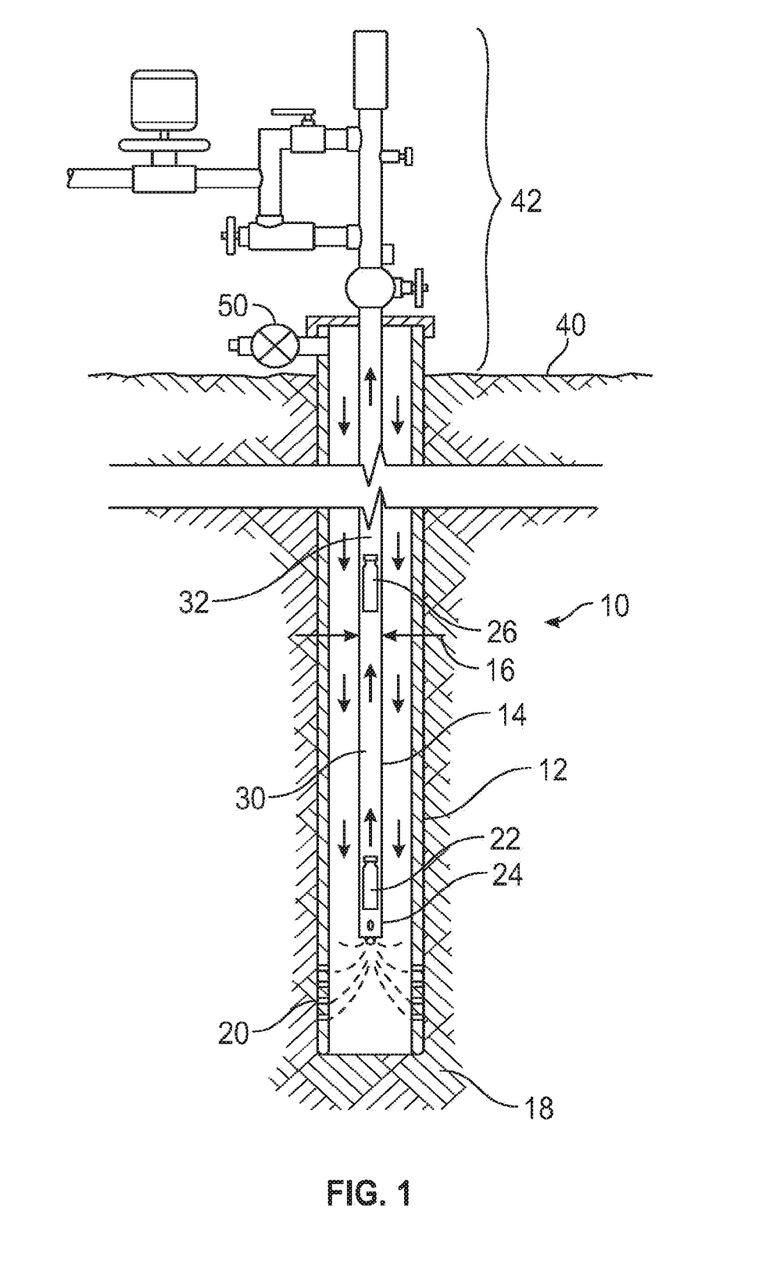
FIG. 1 illustrates an oil and gas well fitted with a plunger lift system for controlling production, according to an embodiment of the disclosure.

FIG. 1 illustrates an oil and gas well fitted with a plunger lift system for controlling production, according to an embodiment of the disclosure. In this example, a well 10 is formed by a casing 12 that lines the well 10. A tubing string 14, within casing 12, encloses a well bore 16 through which oil or gas 30 is produced from a formation 18 through perforations 20 in the formation 18. The well 10 includes wellhead apparatus 42 disposed on the surface of the earth 40. Wellhead apparatus 42 is configured to direct production of the well to appropriate receptacles or pipelines (not shown) and to control the plunger lift system, as described in greater detail below. Wellhead apparatus 42 may further include one or more valves 50 that may be configured to allow pressurized gas to be injected into the casing to augment the well's natural pressure.

The plunger lift system includes a lift or bypass plunger 26 that may be introduced into tubing string 14 and allowed fall through gas and liquid in tubing string 14. Plunger 26 is stopped by a bumper spring assembly 22 at the bottom of tubing string 14. In this example, bumper spring assembly 22 is configured to rest on a seating nipple 24 (which may also be called a tubing or collar stop). As described in greater detail below, plunger 26 has a valve that may be opened to allow gas and fluids to flow through plunger 26 during descent of plunger 26. Upon hitting bumper spring assembly 22, the valve may be closed so that plunger 26 forms a seal between gas/liquids above and below plunger 26. Pressure of fluids and/or gas in well bore 16 then pushes plunger 26 upward. As such, plunger 26 pushes or lifts a "slug" of fluid 32 ahead of plunger 26. Plunger 26 thereby acts to clear the liquid load from the well as plunger 26 is forced upward by pressure of gas/liquids below.

Figure 2:
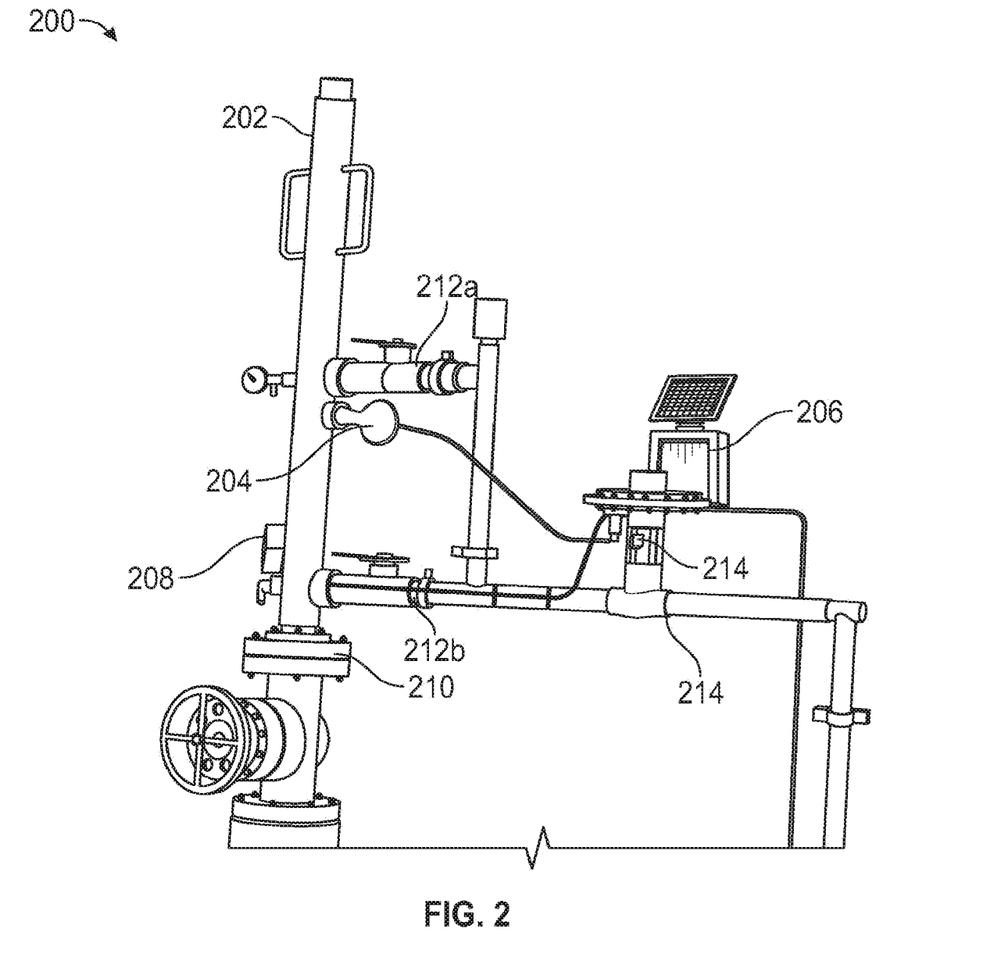
FIG. 2 illustrates an example of wellhead apparatus including lubricator and a control system for a plunger lift system, according to an embodiment of the disclosure.

FIG. 2 illustrates an example wellhead apparatus 200 that includes a control system for a plunger lift system, according to an embodiment of the disclosure. Wellhead apparatus 200 includes a lubricator 202, an auto-catcher 204, an electronic controller 206, and an arrival sensor 208. Lubricator 202 is installed on a wellhead 210 and is configured to receive plunger 26 (e.g., see FIG. 1) upon arrival of plunger 26. Arrival sensor 208 detects arrival of plunger 26 and communicates with controller 206. In turn, controller 206 may provide signals to auto-catcher 204 to catch and hold plunger 26. Controller 206 may also open and close flow valves 212a, 212b and one or more motor valves 214. Controller 206 may be programmed to periodically release plunger 26 to control further cycles of the plunger lift system including recording plunger arrivals, plunger speeds, valve settings (opening/closing), etc.

During operation, plunger 26 is held in position within lubricator 202 until ready for use. When the well is closed or production has decreased below a threshold flow volume (i.e., flow of fluids and/or gases through the well tubing or piping has decreased), plunger 26 may be released and permitted to descend through tubing string 14 (e.g., see FIG. 1). Plunger 26 travels down tubing string 14, due at least in part to gravity, and contacts bumper spring assembly 22 located in the downhole tubing.

Fall speeds of plungers (for example, pad, brush, solid, sand, and spiral type-plungers) typically range from about 50 to about 400 feet/minute. Other types of plungers (for example, bypass, continuous run, flow-through, ball & sleeve, sliding sleeve, etc.) are designed to fall through tubing string 14 while the well is producing. These types of plungers utilize features such as passageways or ports machined into the body or cage of the plunger that permit fluids to flow through the body of the plunger during descent. The fall speeds of these plungers may reach velocities as high as about 2000 feet/minute.

If fall speeds of the plunger are slow, shut-in or non-production time of the well may be increased and production may be lost or delayed. Alternatively, excessive speeds of the falling plungers may cause damage to components of the bumper spring assembly and/or the plunger. For example, components of the plunger, such as the head piece or cage, may become loosened and disconnect from the plunger body causing the plunger to be non-operable. Loose components may also travel through the well tubing uncontrolled and cause damage to the well casing/tubing or other structures. The loose components could also cause the plunger to become stuck or wedged in the well tubing. This could lead to increased well shut-in time while the problem is repaired, and may cause a substantial loss of production. Typically, multiple designs and configurations of plungers may be manufactured and kept in stock to accommodate the various and changing conditions of wells such that the fall speed of the plunger may be controlled to minimize well shut-in time and damage to the components.

Figure 3:
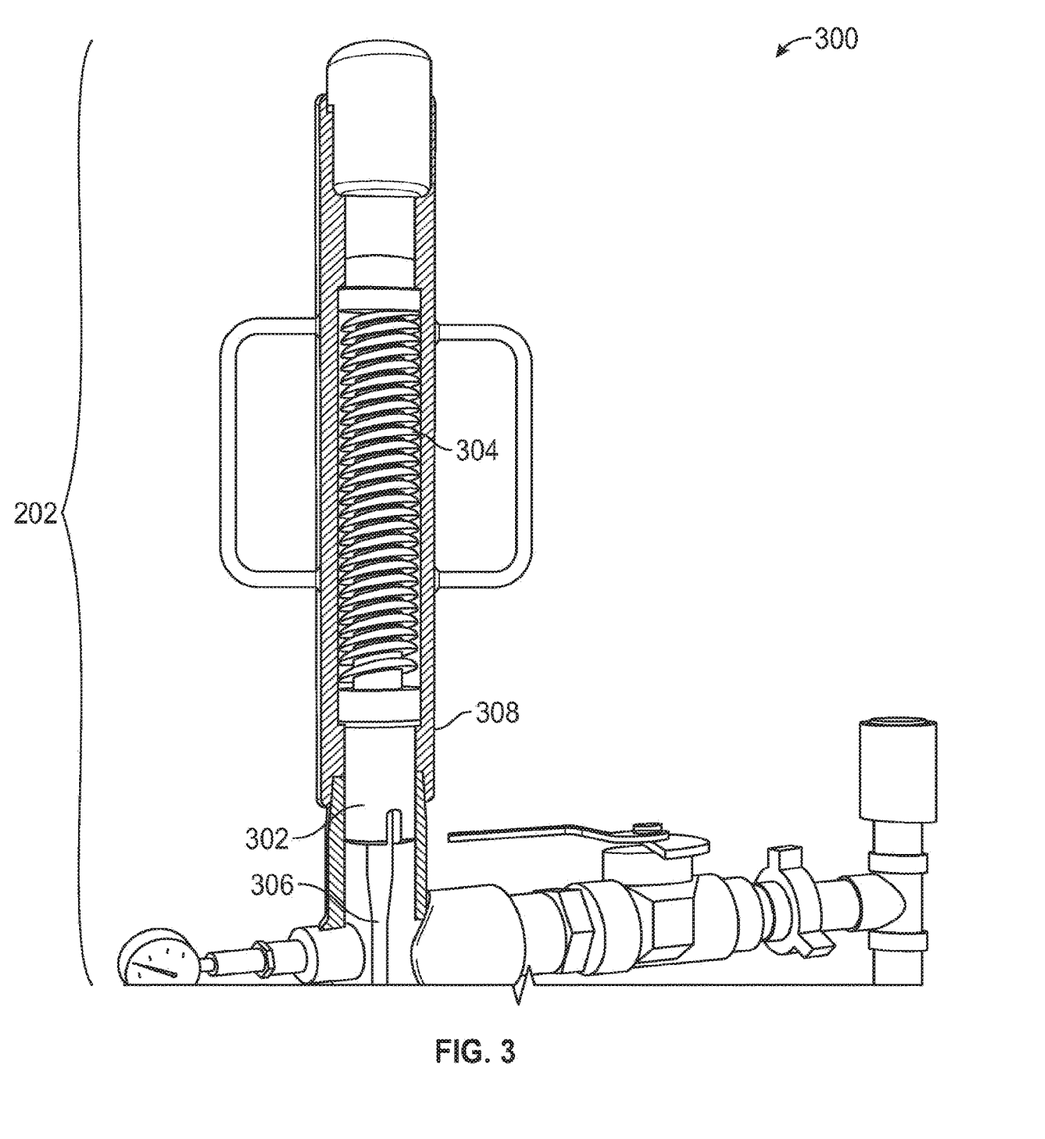
FIG. 3 illustrates a cross-sectional view of the lubricator of FIG. 2, according to an embodiment of the disclosure.

FIG. 3 illustrates a cross-sectional view 300 of lubricator 202 of FIG. 2, according to an embodiment of the disclosure. Lubricator 202 includes an anvil 302, springs 304, and a shifting rod 306. Upon arrival, the plunger (not shown) hits anvil 302 and is stopped by springs 304. Shifting rod 306 is configured to interact with the plunger (not shown) to open valves in the plunger, as described in greater detail below. Lubricator 202 further includes a removable cap 308 that may be unscrewed and removed for installation and/or inspection and removal of the various components of the lubricator 202. The plunger (described in greater detail below) may also be installed by removing cap 308.

Figure 4:
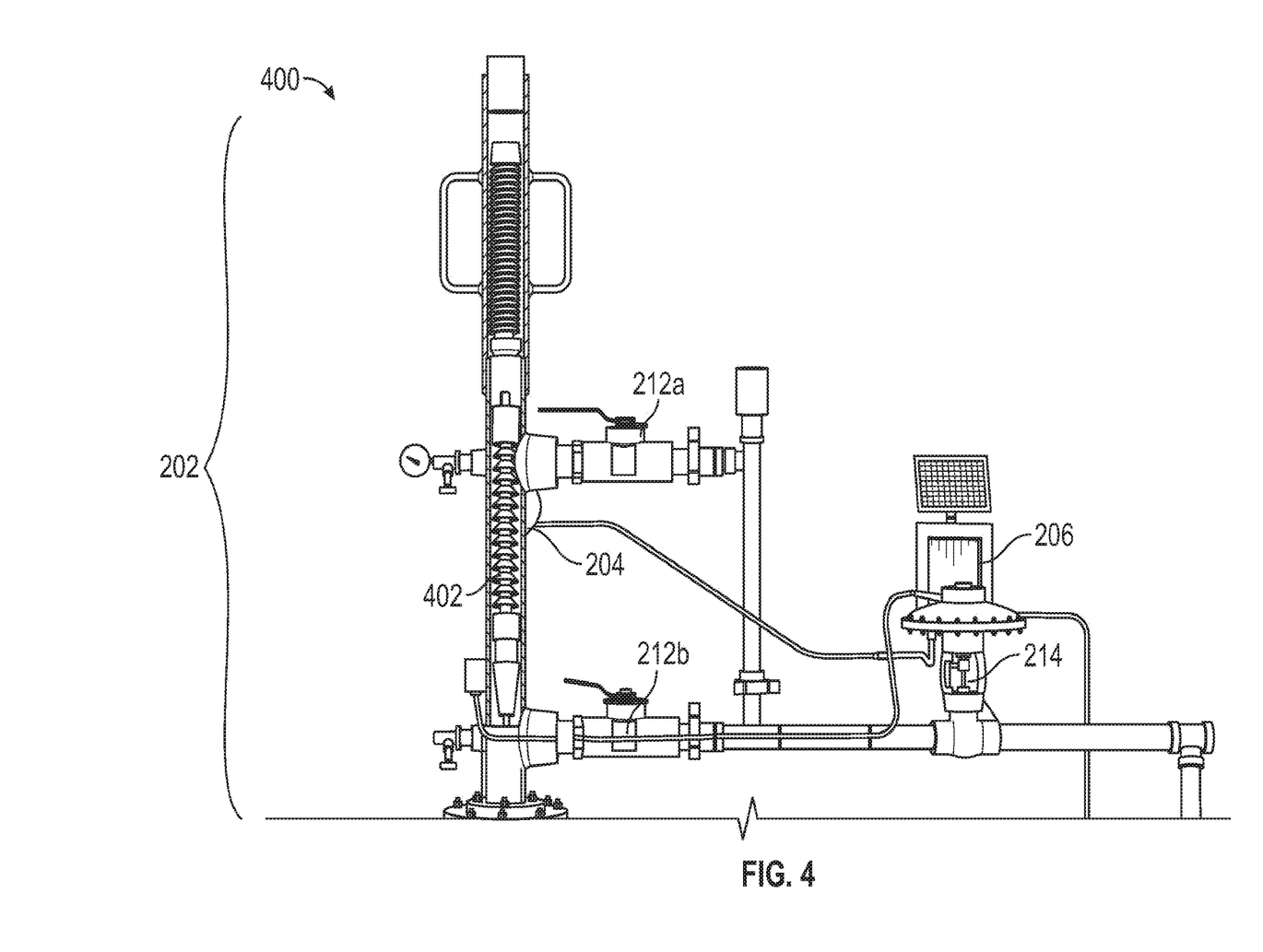
FIG. 4 illustrates a further cross-sectional view of the lubricator of FIG. 2 showing a plunger being held in the lubricator, according to an embodiment of the disclosure.

FIG. 4 illustrates a further cross-sectional view 400 of lubricator 202 of FIGS. 2 and 3 showing a plunger 402 being held in the lubricator, according to an embodiment of the disclosure. In this configuration, controller 206 may send signals to auto-catcher 204 to hold plunger 402 in lubricator 202. In this configuration, controller 206 may hold motor valve 214 open to allow production flow of gas and/or fluids from the well. At suitable time intervals, controller 206 may close motor valve 214 and may control auto-catcher 204 to release plunger 402. Upon release, plunger 402 may fall into tubing string 14 (e.g., see FIG. 1), as described above.

A plunger lift system utilizes a well's natural energy (i.e., pressure) to lift liquids from the tubing string to maintain optimized well production. In this regard, a plunger is forced upward by the naturally occurring pressure within the well. The pressure on the plunger may also be increased by directly injecting gas into the well. A plunger lift system that introduces gas into the well in this way is called a "gas assisted plunger lift" (GAPL) system. In such systems, gas injection may be provided through one or more valves 50 (e.g., see FIG. 1) and may be controlled manually or automatically by lowering or raising a gas injection rate depending on the performance of the plunger lift system, as characterized by monitoring plunger speed and/or velocity. Such control of gas injection may directly affect daily well production.

A slowly rising plunger may indicate reduced well pressure due to liquid loading. Gas injected by a GAPL system may increase the pressure on the plunger to thereby increase the speed of the plunger thereby increasing the rate at which liquid is removed from the well. As liquid is cleared by the plunger, naturally occurring pressure within the well generally increases. The increased pressure, in turn, leads to an increase in the speed at which the plunger rises to the surface due to the naturally occurring pressure within the well. With a faster moving plunger, less gas injection by the GAPL system is required to achieve a given rate at which liquid is be cleared from the well. In this way, plunger speed may serve as an indicator of the performance of the well. As such, reduced gas injection is required for a relatively faster plunger, and increased gas injection is required for a relatively slower plunger.

Alternatively, higher well pressure leads to a higher flow rate of the well. Thus, flow rate and/or plunger speed may be used as a metric to characterize performance of the well. A sales meter or other device may be used to measure a net flow rate of the well. Gas may be injected at a first rate into a well have a relatively low flow rate. As liquid is cleared from the well by the plunger the flow rate of the well may increase. A controller 206 may then be used to decrease a rate of gas injection to a second rate upon detection of an increase in flow rate of the well. For example, a well having a flow rate of 400 mcf (i.e., 400,000 cubic feet per day) may be assisted by gas injection at a rate of 400 mcf to give a net flow rate of 800 mcf. After one or more cycles of GAPL, the flow rate of the well may increase to, say, 500 mcf. In turn, a controller 206 may be configured to reduce the rate of gas injection to 300 mcf to thereby maintain the net flow rate of 800 mcf to reduce power consumption of the compressor as the productivity of the well increases. Reduction of gas injection further increases well drawdown and thereby allows the well to become more effective.

It may be advantageous to use a controller to control the rate of gas injection to be as small as possible for a given value of a performance metric such as the plunger speed and/or the flow rate of the well. In this way, reduced gas injection rate may lead to cost savings in terms of reduced power consumption by a compressor. Further, for a given application, use of a controller to optimize (e.g., minimize) gas injection rate may allow use of a smaller compressor (i.e., a lower horsepower compressor) than would be needed for a larger well. Such use of a smaller compressor may also represent a cost savings.

According to an embodiment, a controller 206 (e.g., see FIG. 2) may be used to optimize gas injection flow rate through automated controls and/or firmware within the system, based on measured variables that characterize response of the system to changes in injection flow rate. Other variables that may be controlled based on plunger speed or velocity include one or more of: a close time, an afterflow time, a flow rate, a load factor, a tubing pressure, a casing pressure, and a tubing/casing differential pressure. Each of these variables may be controlled based on one or more set points or operating ranges. For example, a certain value (e.g., gas injection flow rate) may be auto-adjusted to maintain a certain value (i.e., set point) or to have a value within a pre-determined range of values. In other embodiments, one or more values may be auto-adjusted independently of the gas injection flow rate.

According to an embodiment, gas injection flow rates may be auto-adjusted based on plunger speed or velocity. Controller 206 may be configured to receive user input and to control various parameters based on the received user input. For example, a user may have an ability to instruct controller 206 adjust parameters every plunger cycle or skip cycles before controller 206 makes an adjustment to one or more parameters. Controller 206 may implement such changes using a program implemented in software, firmware, or hardware. In an example embodiment, controller 206 may allow simultaneous auto-adjusting of the plunger cycle and/or the gas injection flow rate based on measured plunger speed and/or velocity.

Controller 206 may be configured to have a "cycle skip" function. Accordingly, the "cycle skip" feature allows time for adjustments to various parameters to impact performance of the plunger speed before further adjustments are made. As such, by skipping one or more plunger cycles between parameter adjustments, controller 206 may avoid complications, such as well loading or performance degradation, which may otherwise occur with a GAPL system.

Controller 206 may further be configured to allow user input that sets values for minimum and maximum set points. Such set points allow controller 206 to control gas injection flow rates and/or plunger cycles to remain in a stable window of flow rate values to ensure proper gas compressor operations and plunger lift performance. A "minimum" set point is the low-gas injection flow rate trigger that is used to initiate plunger cycle adjustments once the gas injection flow rate has been adjusted down to the minimum set point. A "maximum" set point is the high-gas injection flow rate trigger that is used to initiate plunger cycle adjustments once the gas injection flow rate has been adjusted up to the maximum set point. A "fast-arrival-time-rate-decrease" set point is a trigger that is used to initiate reduction of the gas injection flow rate based on the plunger arrival speed or velocity. A "slow-arrival-time-rate-increase" set point is a trigger that is used to initiate an increase of the gas injection flow rate based on the plunger arrival speed or velocity.

Controller 206 may be configured to perform various parameter adjustments and/or optimizations based on user input. For example, a user may specify "yes" or "no" regarding simultaneous optimization. A "yes" answer tells controller 206 to allow all cycle adjustments to be auto-adjusted based on plunger speed and/or velocity to adjust in unison with delay features. A "no" answer tells controller 206 to auto-adjust gas injection flow rates first, until the gas injection flow rate achieves the maximum or minimum set point. Then controller 206 may be configured to auto-adjust other parameters that control the plunger lift cycle. Simultaneous optimization may achieve optimization more rapidly than separately optimizing the various parameters. Under certain operating conditions, however, it may be advantageous for the user to select the "no" option to control separate adjustment of the various parameters.

Table I. (below) lists various parameters that may be manually or automatically adjusted to control a GAPL system.

TABLE I flow rate set point
flow rate low value
flow rate high value
flow rate gain
flow rate deadband
open value
minimum injection rate
maximum injection rate
fast arrival rate decrease
slow arrival increase
cycle skip option: user provides number of cycles to skip
simultaneous optimization option (user specifies "yes" or "no")

As described above, gas injection rate may be optimized based on plunger speed and/or velocity. Minimum/maximum injection rate set points may be used to limit injection rate to not exceed the range defined by the predetermined maximum and minimum values. For example, if a measured plunger speed is determined to be too fast (i.e., is greater than a pre-determined set point), the gas injection rate may be decreased. For example, the gas injection rate may be decreased in increments of 1 mcf, 2 mcf, etc., based on user input. Similarly, if the measured plunger speed is determined to be too slow (i.e., is less than a pre-determined set point), the gas injection rate may be increased in user-defined increments.

As further described above (and reflected in Table I.) a user may specify one or more plunger cycles to skip. In this regard, if the user specifies to skip 1, 2, 3, etc., plunger cycles, controller 206 will wait the corresponding number of plunger cycles before implementing any further parameter changes. In further embodiments, controller 206 may receive user input that tells controller 206 to simultaneously adjust two or more parameters (e.g., after-flow, close time, injection rate), or to simultaneously adjust all parameters. In further embodiments, as described above, a sub-set of parameters may be adjusted first and then a second sub-set of parameters may be adjusted following adjustment of the first sub-set of parameters. For example, the first sub-set of parameters may include the gas injection rate, and the second sub-set may include after-flow and close time parameters. In this way, controller 206 may adjust injection rate only until a minimum or maximum injection set point is achieved. Once such adjustments are made, controller 206 may then adjust after-flow and close time parameters.

Figure 5:
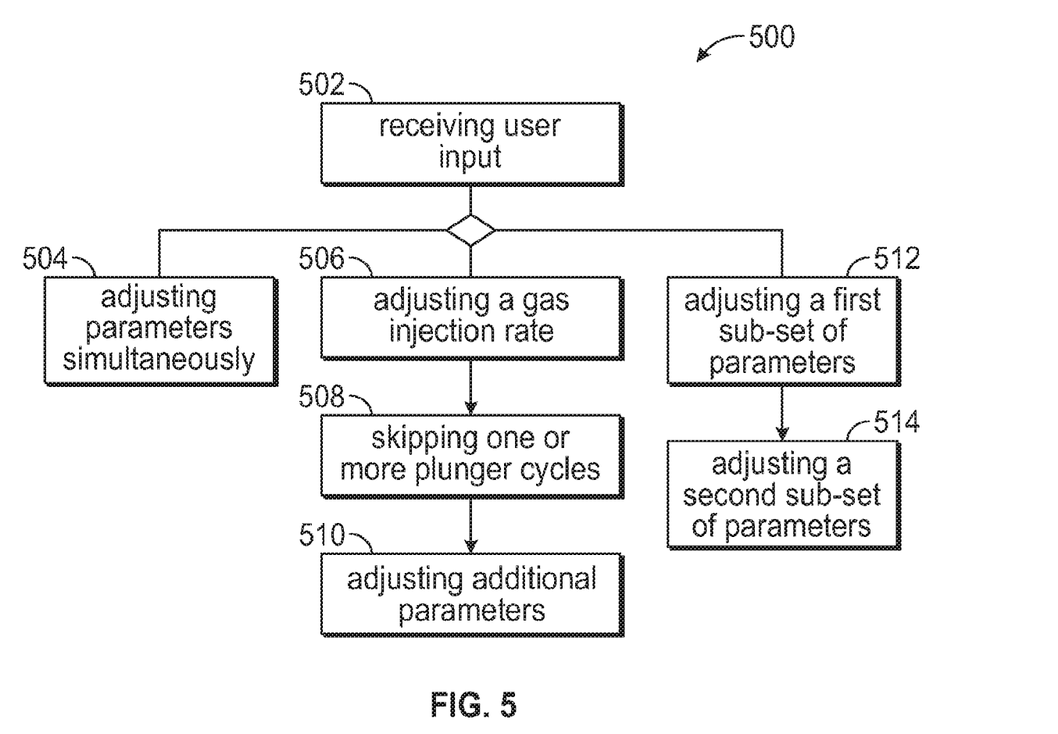
FIG. 5 is a flow chart illustrating a processor-implemented method of controlling a gas assisted plunger lift system, according to an embodiment of the disclosure.

FIG. 5 is a flow chart illustrating a processor-implemented method 500 of controlling a gas assisted plunger lift system, according to an embodiment of the disclosure. In a first stage 502, the method includes receiving, by a processor circuit (e.g., a controller), user input that instructs the processor circuit to perform various operations. In some embodiments, the method 500 illustrates three possible actions that may be taken based on the user input. Other embodiments may include many other possible actions. According to a first user-defined action, the method may include adjusting 504 a plurality of parameters simultaneously. According to a second user-defined action, the method may include adjusting 506 a gas injection rate followed by skipping 508 one or more plunger cycles before adjusting any further parameters of the system. Following stage 508, the method may include adjusting 510 additional parameters of the system. In a third user-defined action, the method may include adjusting 512 a first sub-set of parameters. After a time delay, or immediately following stage 512, the method may include adjusting 514 further parameters of the system.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

While embodiments of this disclosure are described with reference to various embodiments, it is noted that such embodiments are illustrative and that the scope of the disclosure is not limited to them. Those of ordinary skill in the art may recognize that many further combinations and permutations of the disclosed features are possible. As such, various modifications may be made to the disclosure without departing from the scope or spirit thereof. In addition or in the alternative, other embodiments of the disclosure may be apparent from consideration of the specification and annexed drawings, and practice of the disclosure as presented herein. The examples put forward in the specification and annexed drawings are illustrative and not restrictive. Although specific terms are employed herein, they are used in a generic and descriptive sense only and not for purposes of limitation.

The invention claimed is:

1. A control system for a gas assisted plunger lift system, the control system comprising:
   a sensor configured to measure at least one of a well flow rate and a plunger speed and/or velocity; and
   a processor circuit, configured to perform operations including:
      receiving user input that defines one or more parameters selected from the group consisting of: a well flow rate set point, a well flow rate low value set point, a well flow rate high value set point, a well flow rate gain set point, a well flow rate deadband, an open value for a well production valve, a fast arrival rate decrease set point, a slow arrival rate increase set point, a cycle skip option, and a simultaneous optimization option and wherein the received user input defines at least one of a fast arrival decrease set point and a slow arrival increase set point; and
      adjusting a gas injection rate parameter based on the received user input and at least one of the well flow rate and the measured plunger speed and/or velocity.

2. The control system of claim 1, wherein the processor circuit is further configured to adjust, based on at least one of the well flow rate and the measured plunger speed and/or velocity, one or more parameters selected from the group consisting of: a close time, an after-flow time, a well flow rate, a load factor, a tubing pressure, a casing pressure, and a tubing/casing differential pressure.

3. The control system of claim 2, wherein the controller is further configured to adjust all parameters simultaneously.

4. The control system of claim 2, wherein the controller is further configured to adjust a first sub-set of parameters at a first time and then adjust a second sub-set of parameters at a second time later than the first time.

5. The control system of claim 4, wherein the first sub-set of parameters includes the gas injection rate parameter and the second sub-set of parameters includes after-flow and close time parameters.

6. The control system of claim 2, wherein the processor circuit is further configured to perform operations comprising:
   adjusting one or more parameters; and
   skipping one or more plunger cycles before making further adjustments.

7. The control system of claim 1, wherein the simultaneous optimization option instructs the control system whether to simultaneously optimize all parameters or to optimize one or more sub-sets of parameters.

8. The control system of claim 1, wherein the processor circuit is further configured to perform operations comprising:
   increasing a gas injection rate when a plunger speed is below a first pre-determined value; and
   decreasing the gas injection rate when the plunger speed is above a second pre-determined value.

9. The method of claim 1, wherein the simultaneous optimization option instructs the control system whether to simultaneously optimize all parameters or to optimize one or more sub-sets of parameters.

10. The control system of claim 1, wherein the received user input defines a cycle skip option.

11. A processor-implemented method of controlling a gas assisted plunger lift system, the method comprising:
    receiving, by a processor circuit, a signal from a sensor indicating at least one of a well flow rate and a measured speed and/or velocity of a plunger; and
    performing, by the processor circuit, operations including:
       receiving user input that defines one or more parameters selected from the group consisting of: a well flow rate set point, a well flow rate low value set point, a well flow rate high value set point, a well flow rate gain set point, a well flow rate deadband, an open value for a well production valve, a fast arrival rate decrease set point, a slow arrival rate increase set point, a cycle skip option, and a simultaneous optimization option and wherein the received user input defines at least one of a fast arrival decrease set point and a slow arrival increase set point; and
       adjusting a gas injection rate parameter based on the received user input and at least one of the well flow rate and the measured plunger speed and/or velocity.

12. The method of claim 11, wherein the processor circuit is further configured to adjust, based at least in part on the received user input and at least one of the well flow rate and the measured plunger speed and/or velocity, one or more parameters selected from the group consisting of: a close time, an after-flow time, a well flow rate, a load factor, a tubing pressure, a casing pressure, and a tubing/casing differential pressure.

13. The method of claim 12, wherein the processor circuit is further configured to adjust all parameters simultaneously.

14. The method system of claim 12, wherein the processor circuit is further configured to adjust a first sub-set of parameters at a first time and then adjust a second sub-set of parameters at a second time, the second time occurring later than the first time.

15. The method of claim 14, wherein the first sub-set of parameters includes the gas injection rate parameter and the second sub-set of parameters includes after-flow and close time parameters.

16. The method of claim 12, wherein the processor circuit is further configured to perform operations comprising:
    adjusting one or more parameters; and
    skipping one or more plunger cycles before making further adjustments.

17. The method of claim 11, wherein the processor circuit is further configured to perform operations comprising:
    increasing a gas injection rate when a plunger speed is below a first pre-determined value; and
    decreasing the gas injection rate when a plunger speed is above a second pre-determined value.

18. The method of claim 11, wherein the received user input defines a cycle skip option.

19. A control system for a gas assisted plunger lift system, the control system comprising:
    a sensor configured to measure a plunger speed and/or well flow rate; and
    a processor circuit, configured to perform operations including:
       receiving user input that defines one or more parameters selected from the group consisting of: a fast arrival rate decrease set point, a slow arrival rate increase set point, a cycle skip option, and a simultaneous optimization option;

automatically adjusting a gas injection rate parameter based on the received user input and the measured plunger speed and/or well flow rate; and skipping one or more plunger cycles before making further automatic adjustments.

20. A processor-implemented method of controlling a gas assisted plunger lift system, the method comprising:

receiving, by a processor circuit, a signal from a sensor indicating a measured plunger speed and/or well flow rate and performing, by the processor circuit, operations including:

receiving user input that defines one or more parameters selected from the group consisting of: a fast arrival rate decrease set point, a slow arrival rate increase set point, a cycle skip option, and a simultaneous optimization option;

automatically adjusting a gas injection rate parameter based on the received user input and the measured plunger speed and/or well flow rate; and skipping one or more plunger cycles before making further automatic adjustments.

* * * * *